United States Patent

Ashfield et al.

[11] 3,872,950
[45] Mar. 25, 1975

[54] VIBRATION DAMPER FOR TRACTOR ROLL-BAR

[75] Inventors: Herbert Edward Ashfield; Stephen Moorhouse, both of Huddersfield, England

[73] Assignee: David Brown Tractors Limited, Huddersfield, England

[22] Filed: July 2, 1973

[21] Appl. No.: 375,789

[30] Foreign Application Priority Data
July 13, 1972 United Kingdom............... 32766/72

[52] U.S. Cl.............................. 188/1 B, 280/150 C
[51] Int. Cl.......................... F16f 7/10, 60 R, 21/02
[58] Field of Search................ 188/1 B; 280/150 C

[56] References Cited
UNITED STATES PATENTS

| | | |
|---|---|---|
| 1,867,708 | 7/1932 | Paton........................... 188/1 B UX |
| 2,729,462 | 1/1956 | Maybrier........................ 280/150 C |
| 2,797,931 | 7/1957 | Hans .............................. 188/1 B X |
| 3,113,640 | 12/1963 | Stedman............................. 188/1 B |
| 3,242,791 | 3/1966 | Smith ................................ 188/1 B |
| 3,388,772 | 6/1968 | Marsh et al. ........................ 188/1 B |

Primary Examiner—Duane A. Reger
Attorney, Agent, or Firm—Norris & Bateman

[57] ABSTRACT

Roll-bar, safety frame and cab structures of agricultural tractors tend to vibrate badly around specific engine speeds. Such structures include at least one transverse tubular frame member within which a metal bar is suspended by rubber pads, the required degree of compression of which is achieved by the use of shims. The mass of the bar is carefully determined so that when vibration occurs in the structure including the tubular frame member, the bar also vibrates but the periodicity of the two vibrations is such that they tend to cancel each other out.

7 Claims, 2 Drawing Figures

VIBRATION DAMPER FOR TRACTOR ROLL-BAR

BACKGROUND OF INVENTION

The invention relates to roll-bars and safety frames for agricultural tractors, which must by law be fitted in certain countries to protect the driver if the tractor should roll sideways or rearwards, and to tractor cabs particularly but not exclusively those based on roll-bars and safety frames.

The object of the invention is to damp vibrations which tend to occur in these structures around specific engine speeds. Such vibrations in turn excite other parts of the tractor, particularly its sheet metal components, and are especially troublesome in the case of roll-bars which comprise two upwardly projecting supports adapted to be secured to the rear axle case and/or final drive cases and a robust transverse member rigidly interconnecting the upper ends of said supports. The rigidity of such a roll-bar causes it to act like a tuning fork, and damping of the vibrations is desirable in order to reduce the noise to which the driver is subjected and fretting with its resultant wear.

SUMMARY OF INVENTION

According to the invention, a roll-bar, safety frame or cab for an agricultural tractor includes at least one hollow frame member within which a vibration-damping mass is suspended by resilient means.

The invention is particularly concerned with damping vibrations set up in a safety structure for any agricultural tractor, such for example as that shown in Maybrier U.S. Pat. No. 2,729,462, having an engine and a supporting structure mounted on ground engaging wheels drive connected to the engine, the safety structure comprising frame means fixed upon the supporting structure and adapted to surround the driver of the tractor, and the frame means comprising at least one relatively rigid hollow frame member such as a section of the roll or guard bar frames illustrated in said patent, within which is mounted resilient means and a vibration damping mass suspended by said resilient means for damping vibrations set up in the safety structure as at certain engine speeds.

BRIEF DESCRIPTION OF DRAWINGS

A preferred embodiment of the invention will now be described, by way of example only, with reference to the accompanying drawings of which.

DESCRIPTION OF PREFERRED EMBODIMENT

Figure 1:
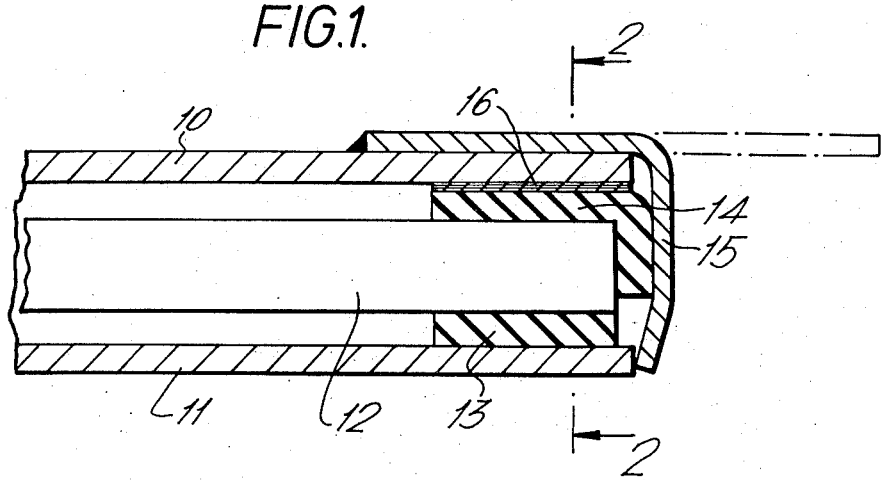
FIG. 1 is a sectional elevation of part of a roll-bar for an agricultural tractor.
Figure 2:
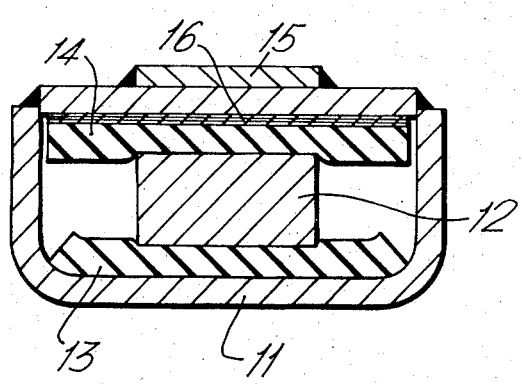
FIG. 2 is a section on the line 2—2 in FIG. 1.

A roll-bar for an agricultural tractor comprises two upwardly projecting supports adapted to be secured to the rear axle case of the tractor, and a transverse member rigidly interconnecting the upper ends of said supports. Referring now to the drawings, said member is a tube of rectangular cross-section produced by welding together an elongated plate 10 and a rolled channel 11. Located within this tube 10, 11 is a steel bar 12 having a rectangular cross-section which is substantially less than the cross-section of the hole through the tube. The bar 12 is suspended within the tube 10, 11 by a pair of rubber pads at each of its ends. One pad 13 of each pair is disposed between the underside of the bar 12 and the bottom of the channel 11 and the other pad 14 is disposed between the upper side of the bar 12 and the underside of the elongated plate 10 and also between the end face of the bar 12 and a tab 15 welded to said plate, which tab is bent so as to close the end of the tube 10, 11 after the location of the bar 12 and the pads 13, 14 therein. The required degree of compression of the pads 13, 14 is achieved by means of shims 16 fitted horizontally in conjuction therewith.

The mass of the bar 12 must be carefully determined so that when a vibration occurs in the tube 10, 11, the bar 12 also vibrates but the periodicity of the two vibrations is such that they tend to cancel each other out. Thus the transmission of vibration from the roll-bar to other parts of the tractor is prevented or minimised.

In a modification, the bar has a non-rectangular, for example a circular, cross-section. In another modification, resilient means other than rubber pads, for example springs or metal wool, are employed. In a further modification, the upwardly projecting supports are adapted to be secured to the final drive cases of the tractor, or to both the rear axle case and the final drive cases. In yet another modification, the invention is applied to safety frames or cabs having more than two upwardly projecting supports and in some cases more than one transverse member, such as the type of safety frame in use in the United Kingdom and Scandinavia. In yet a further modification, instead of fitting shims, the tube is compressed vertically in the region of the pads, after the location of the bar and the pads therein, to deform the bottom of the channel and thereby give the required degree of compression of the pads.

We claim:

1. In a safety structure for an agricultural tractor having an engine and a supporting structure mounted on ground engaging wheels drive connected to said engine, said safety structure being in the form of a roll bar or bars, a safety frame or a cab structure or the like, said safety structure including frame means effectively fixed with respect to said supporting structure and protectively surrounding the driver of the tractor, the improvement in said frame means comprising at least one non-rotatable hollow frame member within which is mounted resilient means and a vibration damping mass suspended by said resilient means for damping vibrations set up in said safety structure as at certain engine speeds.

2. A safety structure according to claim 1, wherein the member is a transverse tube.

3. A safety structure according to claim 1, wherein the mass is a metal bar.

4. A safety structure according to claim 1, wherein the resilient means are rubber pads.

5. A safety structure according to claim 1, wherein the mass and the resilient means are located within the member by metal tabs secured to the member and bent into operative position to close the ends of the member after the location of the mass and the resilient means therein.

6. A safety structure according to claim 1, wherein shims are interposed between said hollow frame member and said resilient means, to give a required degree of compression of said resilient means.

7. A safety structure according to claim 1, wherein the member is compressed in the region of the resilient means, after the location of the mass and the resilient means therein, to give a required degree of compression of the resilient means.

* * * * *